United States Patent [19]
Killpatrick et al.

[11] Patent Number: 5,489,981
[45] Date of Patent: Feb. 6, 1996

[54] MICROPROCESSOR CONTROLLED ANGLASER GYROPOWER CONTROL SYSTEM

[75] Inventors: Joseph E. Killpatrick; Dale F. Berndt, both of Hennepin, Minn.

[73] Assignee: Honeywell Inc., Minneapolis, Minn.

[21] Appl. No.: 250,418

[22] Filed: May 27, 1994

[51] Int. Cl.$^6$ .................................................. G01C 19/66
[52] U.S. Cl. ............................................ 356/350; 372/94
[58] Field of Search ................................. 356/350; 372/94

[56] References Cited

U.S. PATENT DOCUMENTS

| | | | |
|---|---|---|---|
| 4,282,495 | 8/1981 | Ljong | 356/350 |
| 5,076,694 | 12/1991 | Aronowitz | 356/350 |
| 5,088,824 | 2/1992 | Killpatrick et al. | 356/350 |
| 5,100,235 | 3/1992 | Priddy et al. | 356/350 |

*Primary Examiner*—Samuel A. Turner
*Attorney, Agent, or Firm*—Thomas A. Rendos; Craig J. Lervick

[57] ABSTRACT

A power control system for a ring laser gyro including a beam intensity readout. A monitor is coupled to the beam intensity readout for generating an intensity signal indicative of the intensity of the beam at an intensity signal output. A signal averager is coupled to the intensity signal output, the signal averager providing an average intensity signal at an average intensity signal output. An analog-to-digital convertor is coupled to the average intensity signal output for converting the average intensity signal output to a digital signal on a digital signal output. A processor is coupled to the digital signal output and generates a power control signal on a power control line in response to and in proportion to the value of the digital signal. A power supply is coupled at a programmable input to the power control line where the power supply means outputs a voltage signal on a voltage supply line coupled to a ring laser gyro electrode, where the voltage signal is responsive to the power control signal and the processor and power supply operate together so as to control a voltage signal in response to variations in beam intensity.

17 Claims, 7 Drawing Sheets

MICROPROCESSOR CONTROLLED ANGLASER GYROPOWER CONTROL SYSTEM

BACKGROUND OF THE INVENTION

The invention relates to gas laser angular rate sensors, also known and referred to in the art as Ring Laser Gyros (RLG's), and more particularly to a microprocessor power control system for energizing an RLG in order to extend its operating life.

DESCRIPTION OF THE PRIOR ART

An integral part of a ring-laser gyro is the laser beam source or generator. One type of laser beam generator comprises electrodes and a discharge cavity in combination with a plurality of mirrors which define a closed path. The path is usually triangular but other paths such as rectangular can be used.

Present day ring-laser gyros employ a gas discharge cavity filled with a gas which is excited by an electric current passing between the electrodes ionizing the gas and creating a plasma. As is well understood by those skilled in the art, the ionized gas produces a population inversion which results in the emission of photons, and in the case of Helium-Neon (He-Ne) gas, a visible light is generated which is indicative of the plasma. If the gas discharge cavity is properly positioned with respect to the plurality of mirrors, the excited gas will result in two counterpropagating laser beams traveling in opposite directions along an optical, closed-loop path defined by the mirrors.

In some embodiments of ring laser gyros, a unitary body provides the gas discharge cavity including the optical closed-loop path. Such a system is shown in U.S. Pat. No. 3,390,606 by Podgorski, which is assigned to the same assignee as the present invention. There an optical cavity is formed in a unitary block. A selected lasing gas is used to fill the optical cavity. Mirrors are positioned around the optical cavity at appropriate locations such that counterpropagating beams are reflected so as to travel in opposite directions along the optical cavity. A gas discharge is created in the gas filled optical cavity by means of an electrical current flowing in the gas between at least one anode and at least one cathode which are both in communication with the gas filled optical cavity.

It should be noted that prior art ring-laser gyro systems often have a pair of anodes and a single cathode which produce two electrical currents flowing in opposite directions. Each of the electrical discharge currents create plasma in the gas. Each current is established by an applied electrical potential, of sufficient magnitude, between one cathode and one anode. Alternately, the RLG may have two cathodes and one anode.

Various factors both external and internal to the RLG can effect beam intensity. Temperature is one external factor. A change in a cavity parameter is example of an internal factor. In the prior art, RLGs are commonly operated with essentially a constant power or constant current input which results in a variable beam intensity due to external or internal factors. A certain magnitude of operating current is selected which under a specified range of external and internal conditions produces a beam whose intensity is adequate for satisfactory operation. However, it has been determined that the useful life of the cathode is a function of the magnitude, over time, of the current it must carry; the greater the magnitude the shorter the useful life of the cathode. In addition, the useful operating life of internal elements of the RLG, such as mirrors, is a function of the magnitude of the operating current; the higher the current, the shorter the operating life. These internal and external factors have caused RLGs to be operated with a higher current than necessary during part of their operating life in order to produce a beam intensity satisfactory for operation under all conditions, thus shortening the potential operational life of the RLG.

In operating a ring laser gyro it is important to maintain the laser beam current in each leg of the ring laser gyro between an anode and a cathode within a desired operating range such as, for example, about 0.15 ma to about 1.0 ma. In the prior art, large resistors called ballast resistors are employed to maintain stability of the plasma within the desired current range. Unfortunately, such ballast resistors tend to be very large resulting in a large amount of wasted power. Further, it is necessary to select these ballast resistors for each individual ring laser gyro out of a range of selectable ballast resistors. This selection or calibration of each ring laser gyro, results in higher production costs and less reliable current control than that which is provided by the present invention. Ballast resistors used in the prior art had to be carefully selected in order to match the current in both legs to within better than one percent (1%) in order to reduce bias characteristics in the ring laser gyro. Further still, current control circuits of the prior art required high voltages and wide bandwidth circuits in order to achieve a high performance ring laser gyro.

The present invention overcomes the deficiencies of the prior art by providing an active current control apparatus which does not require selected ballast resistors, uses conventional active elements and medium performance operational amplifiers, and yields a high performance ring laser gyro with no plasma oscillations over the entire operating range of desirable currents. Furthermore, through the use of a microprocessor based controller, the dynamic active current control apparatus of the invention maintains a high degree of accuracy and reliability in a ring laser gyro system application.

As a basis for designing the active current control apparatus of the present invention, design data was taken on a GG1320 model number ring laser gyro as manufactured by Honeywell Inc. of Minneapolis, Minn. The data taken was within the operating window of laser beam current with cathode current as a function of ballast resistor and with capacitance as a parameter. Since the GG1320 model ring laser gyro operates in the negative resistance region of the current-voltage characteristic, stray capacitance near the anodes can significantly effect the operating window. Operating windows as a function of current were obtained for the regions wherein plasma oscillations occurred. Ballast resistors as low as zero ohms and capacitance less than 15 pF had a very small effect on the operating window. This data was useful in defining the requirements for high voltage and low capacitance semiconductor devices employed in the present invention.

SUMMARY OF THE INVENTION

The present invention provides a power control system for a ring laser gyro in which at least one laser beam is generated by a current flowing in at least a portion of a cavity between ring laser gyro electrodes including an anode and a cathode, the ring laser gyro including a beam intensity readout. A monitor means is coupled to the beam intensity readout for generating an intensity signal indicative of the intensity of said beam at an intensity signal output. A means for signal averaging is coupled to said intensity signal output, said signal averaging means providing an average intensity signal at an average intensity signal output. A means for converting is coupled to the average intensity signal output for converting the average intensity signal output to a digital signal on a digital signal output. A means for processing is coupled to the digital signal output wherein the processing means generates a power control signal on a power control line in response to and in proportion to the value of the digital signal. A power supply means is coupled at a programmable input to said power control line where said power supply means outputs a voltage signal on a voltage supply line coupled to a ring laser gyro electrode, where the voltage signal is responsive to said power control signal and the processing means and power supply means operate together so as to output a voltage signal to increase power to said ring laser gyro electrode in response to a decrease in beam intensity and decrease power to the electrode in response to an increase in beam intensity.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENT

Figure 1:
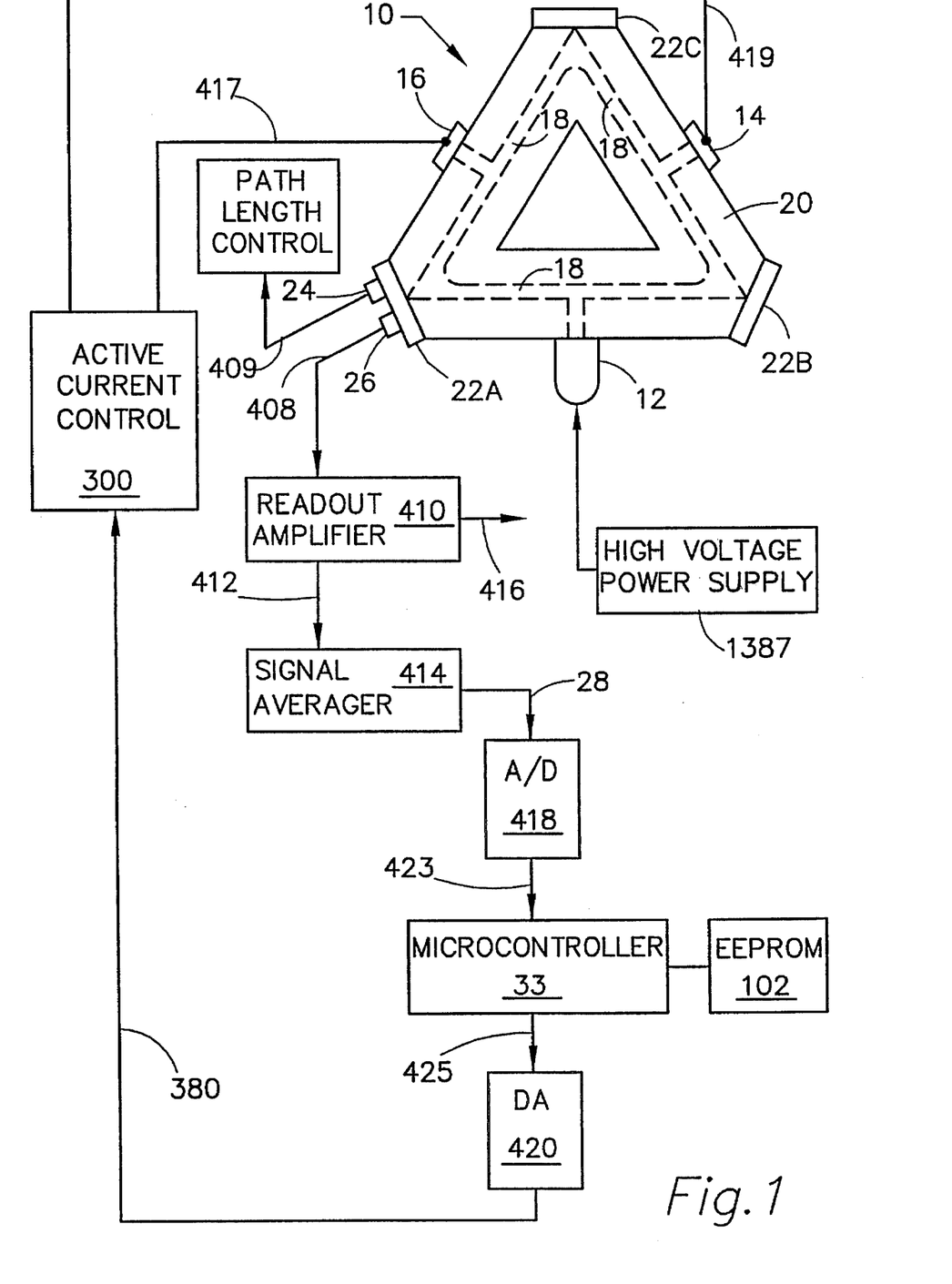
FIG. 1 is a schematic and block diagram drawing of an RLG and a microprocessor power control system in accordance with the teachings of this invention.

Referring now to FIG. 1, a solid block ring-laser gyro (RLG) of the type in widespread commercial use today, designated by the general reference numeral 10, has a cathode 12 and two anodes 14 and 16. The RLG has three channels forming an optical cavity 18 in a solid, thermostable block 20 and three mirrors 22A, 22B and 22C at the intersections of the channels. The cathode 12 is connected to a high voltage power supply 1387. The RLG in this specific embodiment of the invention is itself conventional and one such RLG is described in more detail in U.S. Pat. No. 3,390,606 to Podgorski. It should be noted that while the specific embodiment of the invention described herein employs one cathode and two anodes, the invention is equally applicable to an RLG with a single anode and two cathodes or other anode/cathode combinations, and with RLGs of various designs and configurations.

One of the three mirrors, 22A, is partially transmissive. A beam intensity sensor 24 and a rotational rate output sensor 26 are coupled to the mirror 22A. As is conventional and well known in the art, sensor 24 comprises a photodetector which is optically coupled to the optical cavity 18 so that it responds to a single beam and provides an output indicative of the intensity of the counter rotating laser beams. Sensor 26 comprises a photodetector which is optically coupled to the optical cavity 18 so that it responds to the light and dark fringe patterns generated by the counter-rotating interfering laser beams and provides an A.C. output whose frequency is a function of the rate of rotation of the RLG.

Sensor 24 or 26 may be used to measure the beam intensity. Sensor 26 may be advantageously used because it is more indicative of the actual readout signal. Those skilled in the art will recognize that a light intensity monitor (LIM) signal may also be used to monitor the gyro's beam intensity.

In accordance with the teachings of the invention, the output of sensor 26, called the beam intensity 408, is amplified by a readout amplifier 410, signal averaged by signal averager 414, and transmitted to an A/D converter 418. In one example of the invention the A/D converter 418 may advantageously be integrated into a microprocessor of conventional design.

The output of the signal averager 28 is an input to the A/D converter 418. The digital output 423 of the A/D converter is compared to a desired beam reference value in the microcontroller 33. If the A/D converter output 423 is less than the beam reference value, the microcontroller's output signal 425 is increased. The microcontroller output 425 is provided as an input to a digital to analogue (D/A) convertor 420. A resulting increased analog value on line 380 is provided as an input to an active current control 300 which in turn increases an active current value on lines 417, 419. The increased anode to cathode current increases the beam intensity until the A/D converter output 423 equals the beam reference value.

Since the life time of the RLG is approximately inversely proportional to the cathode current squared, it is advantageous to operate the RLG at the lowest possible cathode current while maintaining beam intensity adequate for reliable operation.

As an RLG ages, the beam intensity 408 tends to decrease. After aging a predetermined number of operating hours, the active current control level may be increased in steps by the microcontroller the next time power is applied to the RLG, in order to avoid any transients during flight operations. The predetermined number of hours may, for example, be 20,000 hours. This number is intended by way of example, and not by way of limitation.

Typically, an RLG requires a different set of compensation terms, often designated $K_1$, $K_2$, $K_3$, $K_4$, $K_5$, etc., for each value of cathode currents. These compensation terms are constants which may be stored in, for example, an electrically erasable programmable read only memory 102 (EE PROM) for each operating current level and loaded into the microcontroller 33 during power up of the RLG.

Figure 2:
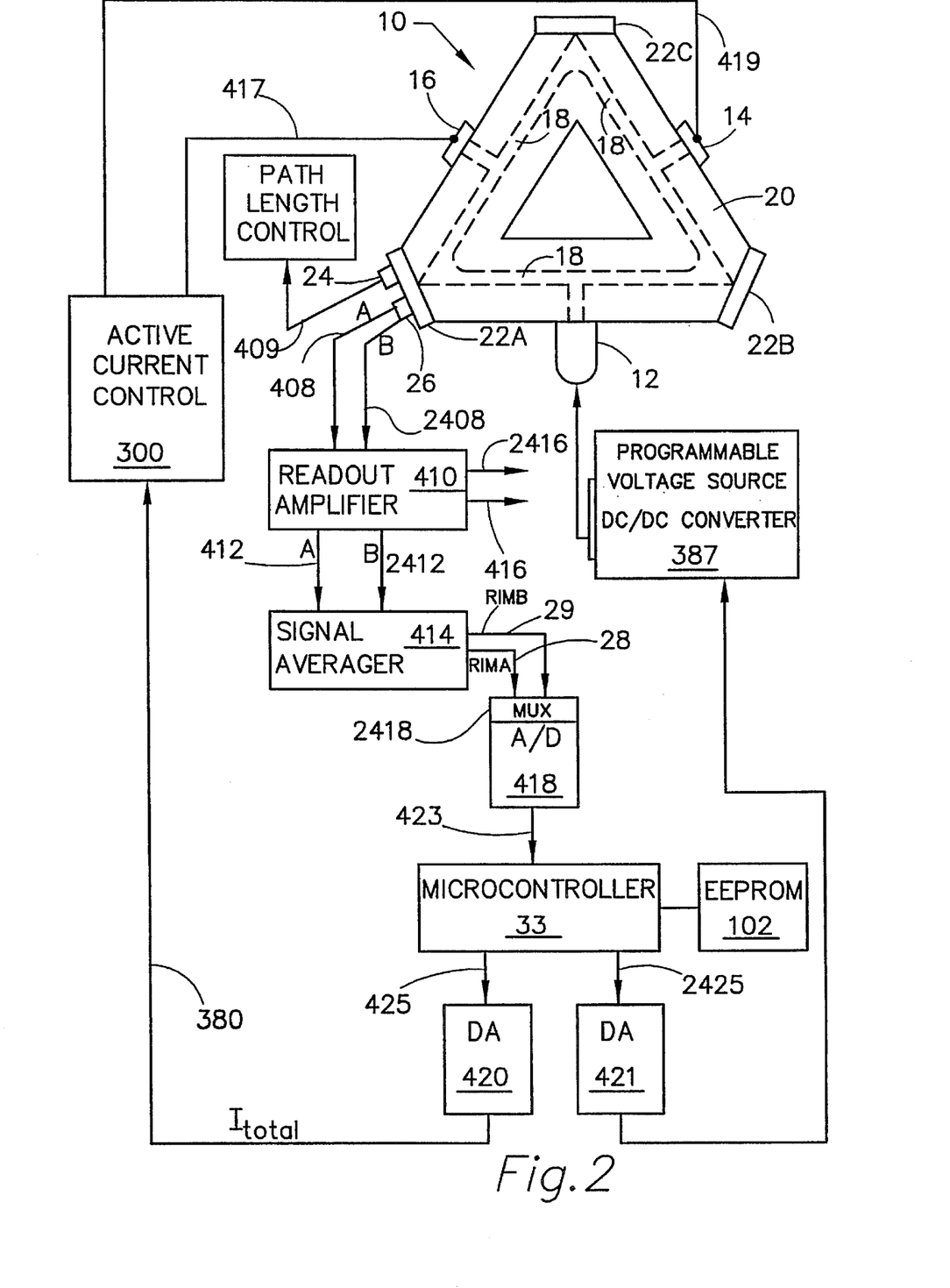
FIG. 2 is a schematic and block diagram drawing similar to FIG. 1 of an RLG and another embodiment of a microprocessor power control system in accordance with the teachings of this invention.

Referring now to FIG. 2, an RLG apparatus similar to the RLG apparatus of FIG. 1 is shown, but in a departure from FIG. 1, the fixed supply voltage provided by high voltage power supply 1387 may advantageously be replaced with a variable voltage supply such as a conventional programmable DC/DC converter 387.

Generally, the apparatus of FIG. 2 takes advantage of the negative characteristic of a well known RLG gas discharge negative resistance characteristic in order to reduce power dissipation inside the RLG housing. As the RLG ages, the active current control value increases, and the voltage drop across the anode to cathode of the plasma decreases because of the negative resistance characteristic. As a result, the cathode voltage may be reduced to conserve power.

Since the RLG 10 operates in a conventional manner, the photodetector 26 provides a split image signal wherein the signal representing path A of the laser beam is impressed upon line 408 and a signal representing path B of the laser beam is impressed upon line 2408. Both A and B readout signals are input into first and second inputs of the readout amplifier 410. The readout amplifier 410 includes a first output 2416, a second output 416, a third output 2412 and a fourth output 412. The first and second outputs 2416 and 416, respectively, carry a readout signal for the A and B paths. These signals may be routed to other circuitry, such as digital logic circuitry for further processing which will not be described here since it is outside the scope of this invention.

Figure 6:
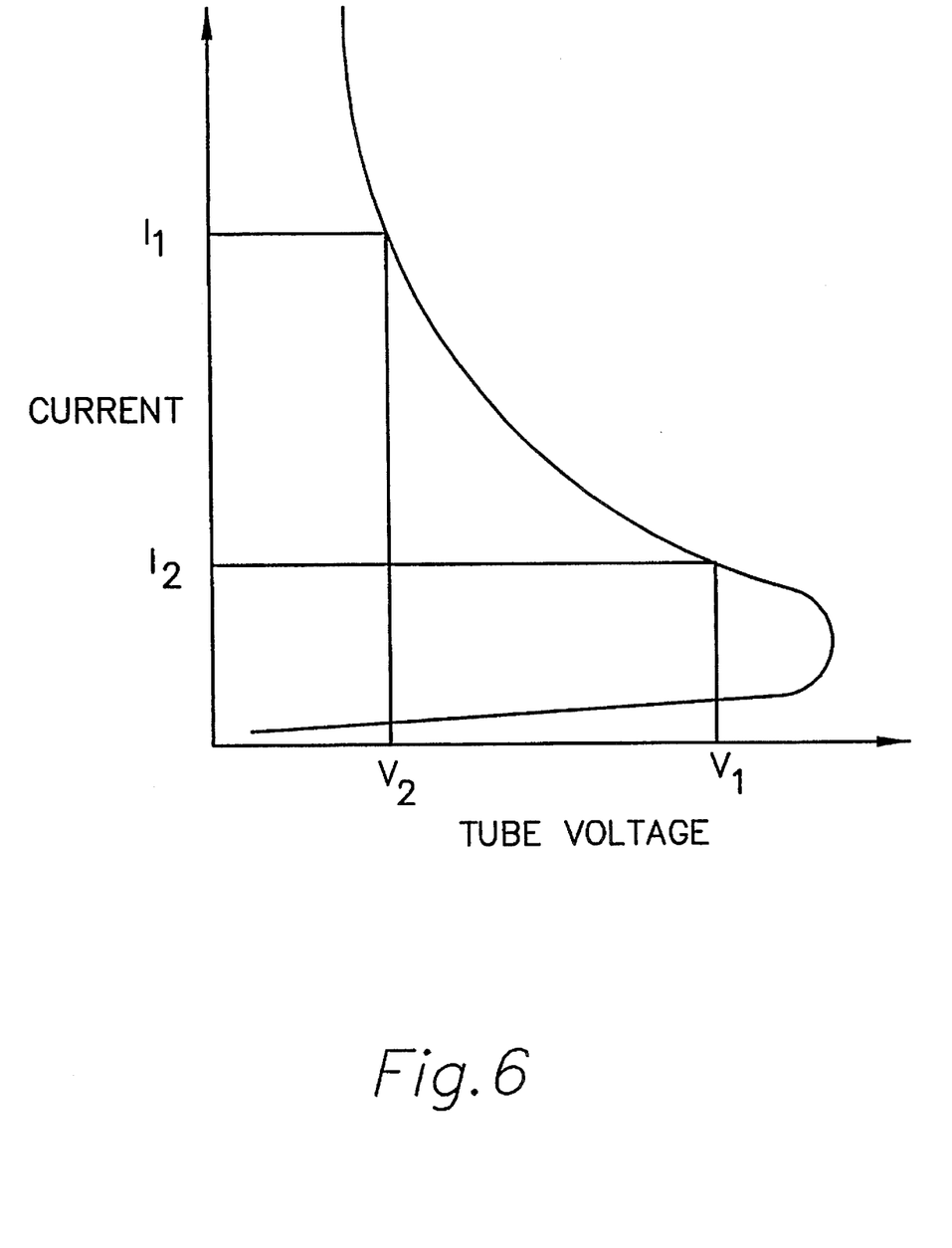
FIG. 6 graphically shows an example of I-V characteristics of a typical Ring Laser Gyro.

The third and fourth outputs of the readout amplifier 412 and 2412, respectively, also carry readout signals A and B which are input into the signal averager 414. The signal averager 414 averages the A and B signals and outputs corresponding signals on first and second signal average outputs 28 and 29 called, respectively, RIM A and RIM B. Such signal averaging may be carried out in a signal average circuit such as that shown in FIG. 3 or may be carried out in a digital process embedded in the software program which is implemented by a microprocessor in a well known manner. If the signal averager outputs an analog signal as shown in the example of FIG. 2, the analog signals on outputs 28 and 29 are transmitted to a multiplexer 2418 which switches the signals using well known switching principles into an analog-to-digital converter 418. Analog-to-digital converter 418 operates to alternately supply microcontroller 33 with a RIM A or RIM B signal via line 423. In one example embodiment of the invention an eight channel analog-to-digital converter is used to convert continuously multiplexed signals into digital representations. Since the laser beam signals being read are slowly varying functions, the microcontroller reads the A and B signals approximately every ⅛ of a dither cycle. Those skilled in the art will recognize that this is not critical since the functions vary so slowly with respect to the operating speed of the microcontroller at 33. Microcontroller 33 is connected to the memory 102 which may, in one example embodiment, advantageously be an electrically erasable programmable read only memory (EE PROM). The EE PROM 102 may be advantageously preloaded with current and voltage characteristics (I-V characteristics) of the particular Ring Laser Gyro being controlled. Such I-V characteristics may be measured for each gyro block in a well understood manner and supplied to the EE PROM 102 by conventional means. In general, the I-V characteristics are measured as a function of anode current and voltage from anode to cathode, the higher the voltage the lower the current is required. Typically, voltage drops and current at the anode increases as the Ring Laser Gyro engages. Such an I-V tube characteristic curve may be plotted using conventional techniques as shown in FIG. 6. The plot may then be converted into numerical form and stored in the EE PROM for use by the microcontroller 33.

The microcontroller 33 checks the RIM A and RIM B signals. It operates to locate the weaker signal, compares that signal with the I-V characteristic stored in EE PROM 102 and outputs a control signal on line 2425 which is responsive to the weaker of the two RIM signals. That is, if the RIM B signal, for example, is weak, as for example, falls below 1.2 volts which is typical for a signal output of signal averager 414, the microcontroller 33 will output a control signal on line 2425 in digital form which is converted by digital-to-analog converter 421 into an analog control signal on line 384 for adjusting programmable voltage source DC to DC converter 387 to output a voltage matched to the I-V characteristic line of the RLG 10 as shown in FIG. 6.

At the same time, microcontroller 33 may output a signal 425 which is the sum of the current in both legs of the gyro end which is input into the active current control 300. Note that the voltages in the RLG vary inversely as the current varies in the gyro and this fact is used in supplying control signal 384 to the programmable voltage source 387.

If the A/D converted value on line 423 is below a reference value stored in the EE PROM 102, the microcontroller outputs control signals on lines 425, 2425, which are converted by D/A converters 420 and 421 into D/A converted values. The resultant analog signal on line 384 controls the DC/DC converter output voltage in a conventional manner which, in turn, adjusts the voltage on cathode 12.

In this example, the output voltage on line 386 is then decreased in magnitude to correspond to the reduction in tube voltage of the plasma. In this example, even though the plasma current has been increased the plasma voltage and power supply voltage has decreased thereby maintaining relatively constant power consumption.

Figure 3:
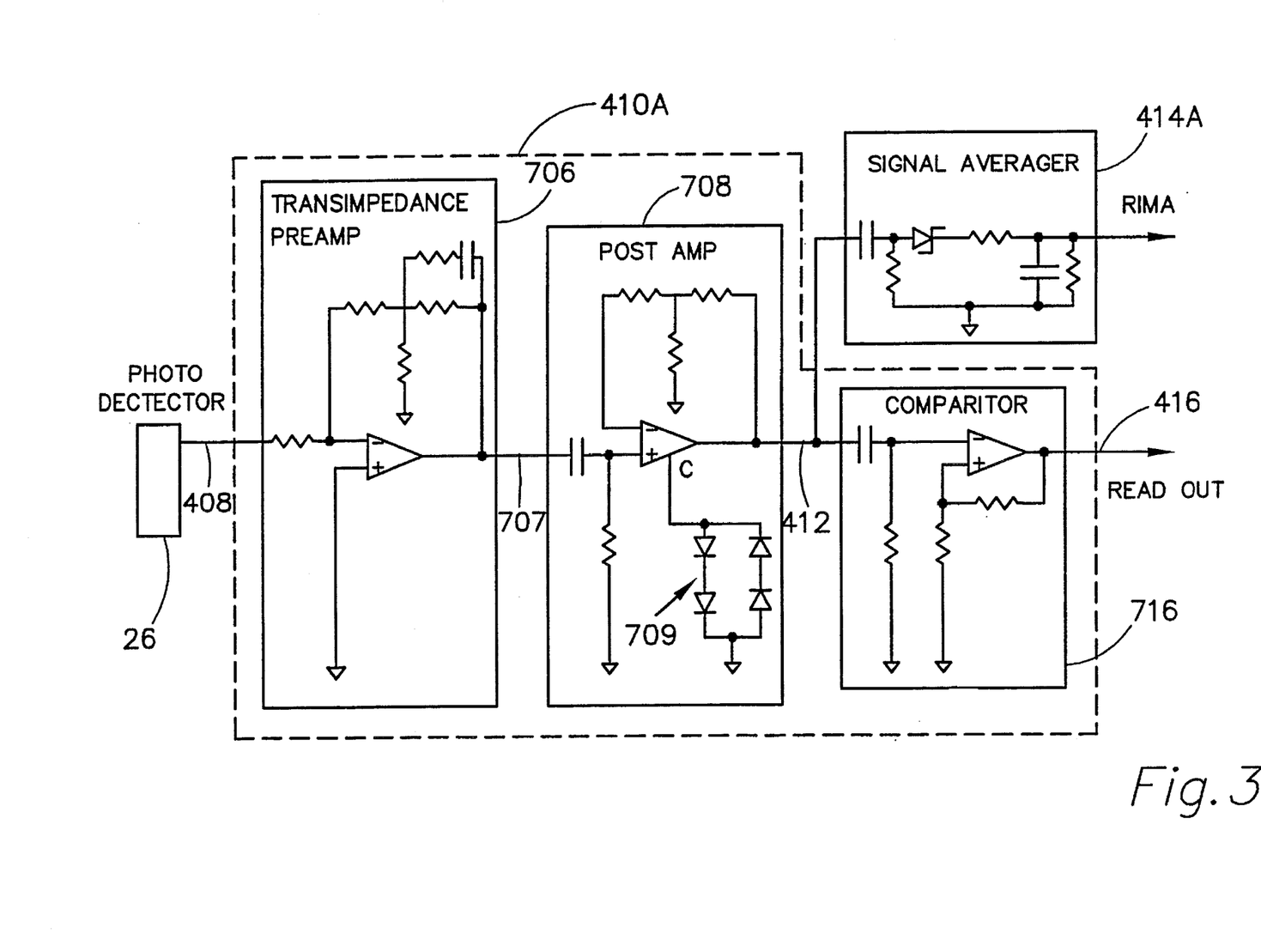
FIG. 3 is a somewhat more detailed schematic drawing of a portion of the power control system shown in FIG. 2.

FIG. 3 shows the readout amplifier, signal averager, and comparator for channel A of the readout circuitry. An identical set of circuits are used on channel B of the readout. The circuits within the broken line designated 410A comprise half of the circuits in readout amplifier 410. Readout amplifier 410 further comprises a duplicate set of circuits for path B signals. Similarly, signal averager circuit 414A comprises one of two identical circuits which are included in signal averager 414.

Preamplifier 706 is a transimpedence amplifier with a gain of about 400 K ohms. Preamplifier 706 is connected to one readout 408 of photodetector 26. A post amplifier 708 has a voltage gain of about 50 and is connected to an output 707 of the preamplifier 706. Therefore the overall transimpedence gain is about 20 megaohms.

In one example, a design feature of the post amplifier 708 is the use of a compensation pin C on an "Analog Device model AD829" TM amplifier to internally clamp the output of the amplifier. This keeps the amplifier out of saturation mode and in the linear high performance range of operation. The high performance clamp 709 allows the gyro to operate over a wide range of beam intensities with no manual component selection in manufacturing. Prior art requires resister selection for each gyro.

The signal averager 414A is coupled to line 412, the output from the post amplifier 708, and outputs a Readout Intensity Monitor (RIM A) signal 28 proportional to the AC value of the readout signal.

The AC readout signal 412 is sent to a comparator 716 with a hysteresis of a few percent, which, in turn, provides a digital signal 416. Channel B is similarly processed, digital signals A and B are then used to produce up/down counts in the digital logic.

Figure 4:
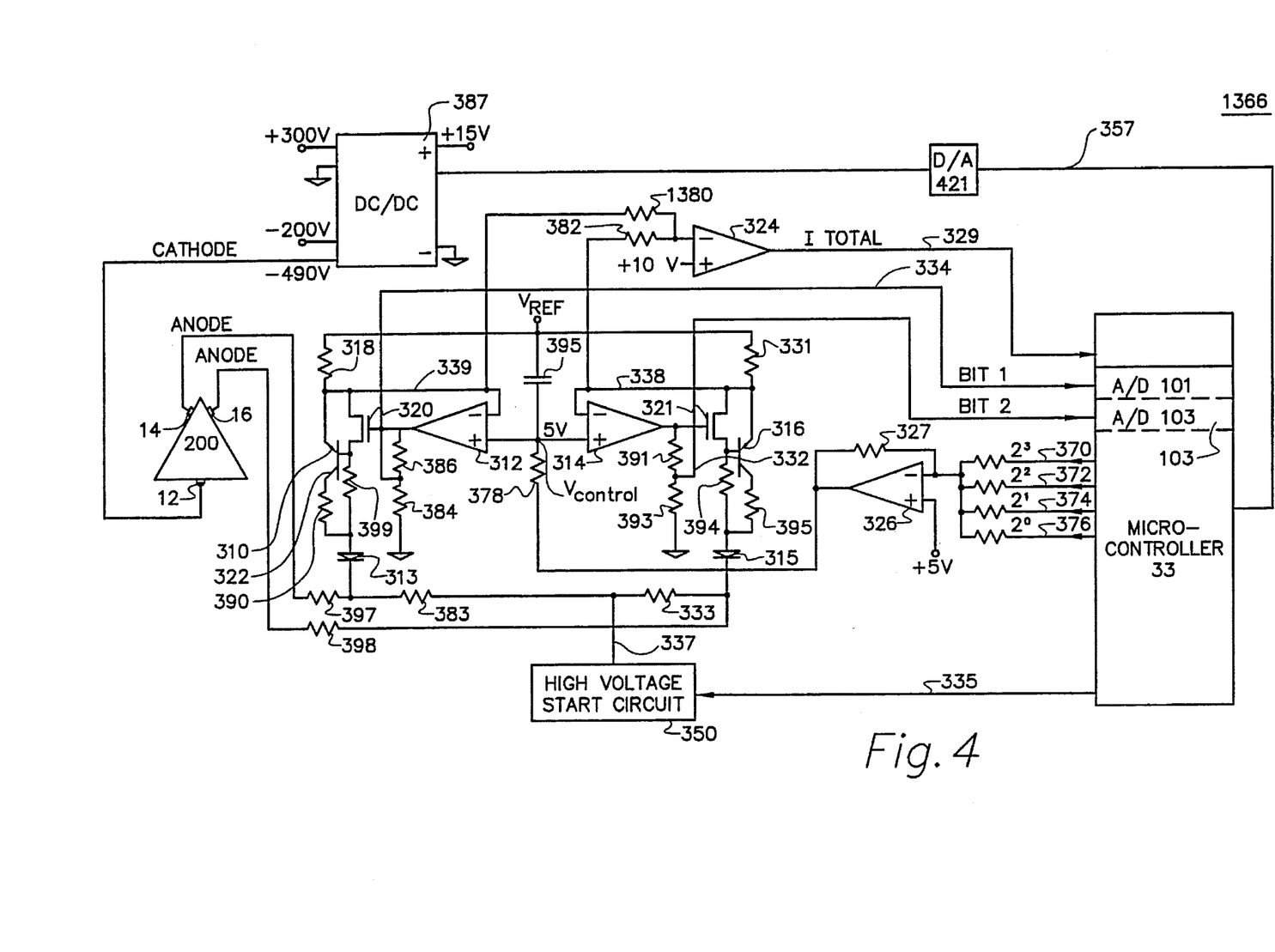
FIG. 4 schematically shows a circuit diagram of one example of an active current control circuit made in accordance with the present invention.

Referring now to FIG. 4, a more detailed circuit diagram of one example of an active current control apparatus as employed in the present invention is shown. Those skilled in the art having the benefit of this disclosure will recognize that the example embodiments described herein are by way of illustration, and not limitation, of the invention. The examples herein are provided in order to aid those skilled in the art in understanding the invention. A ring laser gyro block 10 is illustrated as a triangular block having two anodes 14, 16 and a cathode 12. The active current control apparatus in this example includes first, second, third and fourth amplifying means 312, 314, 324, 326, first and second output transistor means 310, 316, first and second field effect transistor (FET) means 320, 321, and DC/DC conversion means 387.

The fourth amplifying means 326 is coupled to a gain resistor 327 at its inverting input. Also coupled to the inverting input are four input resistors 370, 372, 374 and 376. The controller 33 operates as a means which generates a digital control signal onto the four input resistors. The fourth amplifying means 326 substantially functions as a digital-to-analog converter wherein the four input resistors correspond to a four bit input in which the first input resistor 370 is the most significant bit and the fourth input resistor 376 is the least significant bit. The fourth amplifying means translates the digital control input from the controller 100 into a proportionate analog signal which is applied through resistor 378 to node $V_{control}$. Thus the active current control can be controlled to within 4 bit accuracy at node $V_{control}$ which correspond to a 10 to 5 volt swing at $V_{control}$.

$V_{control}$ is further coupled to the non-inverting inputs of the first and second amplifying means 312, 314. Each of the first and second amplifying means 312 and 314 drives one of two field effect transistors 320, 321 which, in turn, control transistors 310, 316 through which current flows to one of the anodes 14 and 16 on the ring laser gyro block 10. Each of the first and second amplifying means and their associated components may be considered as one "leg" of the active current control. The output of the first amplifier 312, for example, is connected to the gate of a field effect transistor (FET) 320. FET 320 may advantageously be a DMODE FET having a threshold of from about −2 to −4 volts or an equivalent device. FET 320 may advantageously be, for example, an N channel FET such as a JFET or MOSFET with sufficiently low gate impedance to allow substantially all of the current in precision resistors 318, 331 to flow to anodes 14 and 16. FET 320 controls the base drive to high frequency transistor collector 322. Feedback line 339 provides negative feedback to the first current control amplifier 312. The source of FET 320 is connected to feedback line 339. The drain of FET 320 is connected to the base of the first output transistor 310. The emitter of the first output transistor 310 is connected to the feedback line 339 and through resistor 318 to a first terminal of capacitor 396. The second terminal of capacitor 396 is connected to the node $V_{control}$.

In one embodiment of the invention, when fully charged, capacitor 396 maintains a nominal voltage potential of about +10 volts at its first terminal. The first output transistor 310 has its collector 322 connected through a resistor 390 to the anode of diode 313. Diodes 313 and 315 are high voltage diodes rated at, for example, about 5,000 volts, and serve to protect the active current control circuitry during start up of the ring laser gyro. The base of output transistor 310 is connected to the source of FET 320 and a resistor 399 which is also connected to the anode of diode 313. The cathode of diode 313 is connected through resistor 397 to anode 16. The second amplifying means 314 is similarly arranged with its associated components, namely, FET 321, the second output transistor 316 and resistance components 391, 393, 394, 331, 333 and the second diode 315 which is connected at its cathode to the second anode 14. The first amplifying means 312 comprises a first leg of the driving circuit and the second amplifying means 314 and its associated components comprises a second leg of the circuit. Both legs operate in a similar manner to supply substantially equal current to the ring laser gyro. The first and second amplifying means 312, 314 may advantageously comprise operational amplifiers such as, for example, model number LT 1013 having less than about a 1 MHz bandwidth. The first and second transistors 310, 316 may advantageously be slightly reversed biased by 10 volts from base to collector in one example embodiment of the invention. This reverse bias reduces the effective capacitance between the base and collector, thereby improving the transistors' high frequency response.

A third amplifier means 324 may advantageously, optionally be included to provide an output signal 329 which is representative of the analog sum of the current in each leg of the ring laser gyro. The current sum is designated "I Total". An inverting input of the third amplifier means 324 is connected through resistor 1380 to feedback line 339 and through resistor 382 to feedback line 338.

In this example, the cathode 12 of the ring laser gyro is kept at a constant voltage of, for example, in the range of about −425 to −460 volts through DC/DC converter means 387. In operation, DC/DC converter means 387 converts an input voltage of about +15 volts from an external power source to, for example, an output voltage of nominally in the range of about −450 to −490 volts.

Also optionally included in this example of a active current control as provided by the invention are built in test lines BIT 1 and BIT 2. BIT 1 and BIT 2 are coupled to first and second analog-to-digital inputs 101, 103 respectively of microcontroller 33. BIT 1 and BIT 2 provide test signals which are employed by microcontroller 33 to determine whether or not the active current control is in the proper operating range and that the operational amplifiers 312, 314 are not locked up at the high or low power supply limits also called positive and negative rails respectively herein.

It is important to the operation of each leg of the active current control to carefully select the resistors at the output of the current supply legs. For the first leg resistors 390, 399 and 397 must be selected according to the equations listed hereinbelow. Similarly, care must be taken in selecting resistors 395, 394 and 333 in the second leg of the active current control. In the first leg, for example, resistors 390 and 399 must be selected such that the voltage on collector 322 of transistor 310 remains relatively constant over the operating range of the current in the ring laser gyro. In one example of the invention resistors 390, 399 and 397 and their counter parts 394, 395 and 333 were selected to operate for a worst case BETA of 10 for PNP transistor 310, 316 at low currents and low temperatures of about −55 degrees centigrade. The selection of these resistors minimizes power dissipation in the transistors 310 and 316. In one example, current is supplied in the range of about 0.15 to 1 ma per leg. These limits are established by the impedance characteristics of the gas discharge and the current limits of the power supply.

Figure 7:
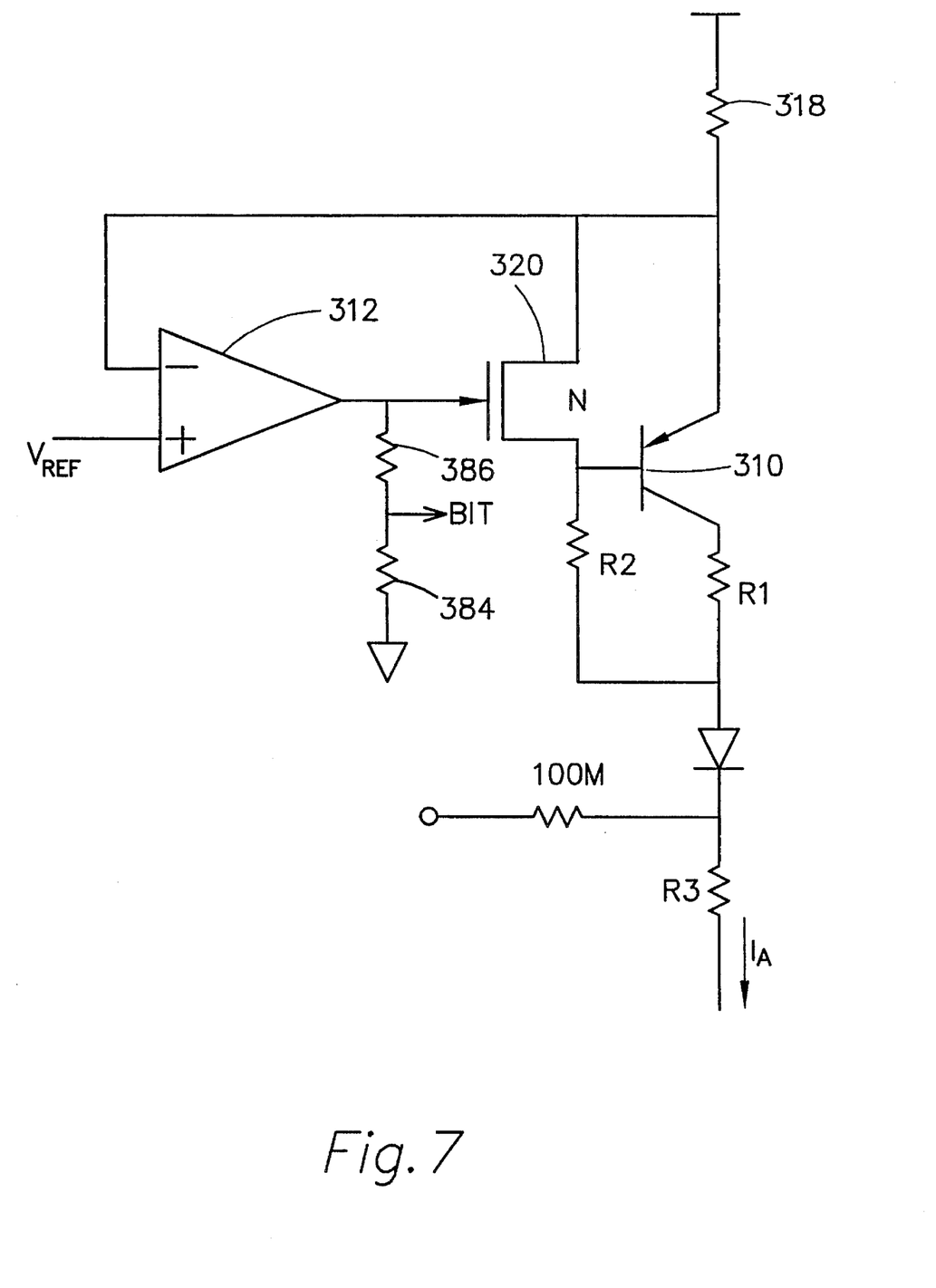
FIG. 7 shows an example of one current source leg in a ring laser gyro circuit.

Referring now to FIG. 7, an example of one current source leg of an embodiment of the active current control of the invention is shown for the purposes of illustrating the selection of resistors R1, R2 and R3. It should be noted here that the active current control of the invention takes advantage of the negative resistance inherent in the ring laser gyro tube. That is, as the gyro demands higher current the voltage from the anode to the cathode drops. The invention selects a ratio for R1 and R2 such that the base drive current through R2 increases as current demand for the ring laser gyro tube increases. The resistors R1 and R3 are particularly selected to minimize the power dissipation in transistor 310 at the maximum current. The following equations illustrate a method employed by the current invention to select resistors R1, R2 and R3 in order to operate with a Beta of 10 or less in the PNP transistor 310.

1. A quadratic fit to current-voltage characteristics over the RLG negative resistance region $I_A=0.15$ to 1 ma is done using the following equation:

$$V_T = K_0 + K_1 I_A + K_2 I_A^2 + \Delta V_{TEMP} + \Delta V_{PROCESS}$$

where:

$V_T$=Tube Voltage;

$V_{TL}$=Tube Voltage at low Temperature;

$V_{TH}$= Tube Voltage at high Temperature;

$V_C$=Cathode Voltage;

$I_A$=Anode Current (one leg);

$V_{CE}$=the transistor collector-emitter voltage; and $K_0$, $K_1$ and $K_2$ are constants for the quadratic fit equation which are specific to the I-V characteristics of the laser discharge in the ring laser gyro being modeled by these equations.

The conditions for R2 are set as follows:

2. $R2 > V_C - V_{TL}/I_{Amin}$

3. $R2 > dV_T/dI_A$ at lowest current.

4. $\frac{R2}{R1} < \beta$

R1 and R3 must satisfy the following equations:

5. $R1 + R3 = \frac{V_C - V_{TL} - V_{CE}?max}{I_{Amax}}$

6. $R1 + R3 = \frac{V_C - V_{TH} - V_{CE}?min}{I_{Amin}}$

7. It is important to note that a PNP transistor has a larger BETA characteristic at −55° C. and lower current when compared to an NPN transistor. Therefore, PNP transistors are preferably used as the current source transistors.

8. In one example an SOT - 23 packaged transistor dissipates less than 100 mw at −55° C. for maximum current.

9. In one example an MMBT6520 transistor was employed having the following frequency characteristic:

F=40 MHz where $C_{cb} < 6$ pF

10. Collector reverse biased by >10 volts to reduce base-collector capacitance.

11. From operating window data taken at Honeywell Inc. it has been found for certain ring laser gyros that if R3>10 K for $C_{cb}<6$ pF, then the operating window is reduced <5%.

All the above conditions are met with:

R1=50 K, R2=421 K, and R3=30 K in one embodiment of the invention.

The active current control apparatus may be built with $V_C$ Fixed or Variable to reduce power consumption. A fixed $V_C$ approach with proper selection of R1, R2, and R3 allows operation with low Beta. The negative resistance of the I-V characteristic is used as an advantage to increase base drive at high currents.

Figure 5:
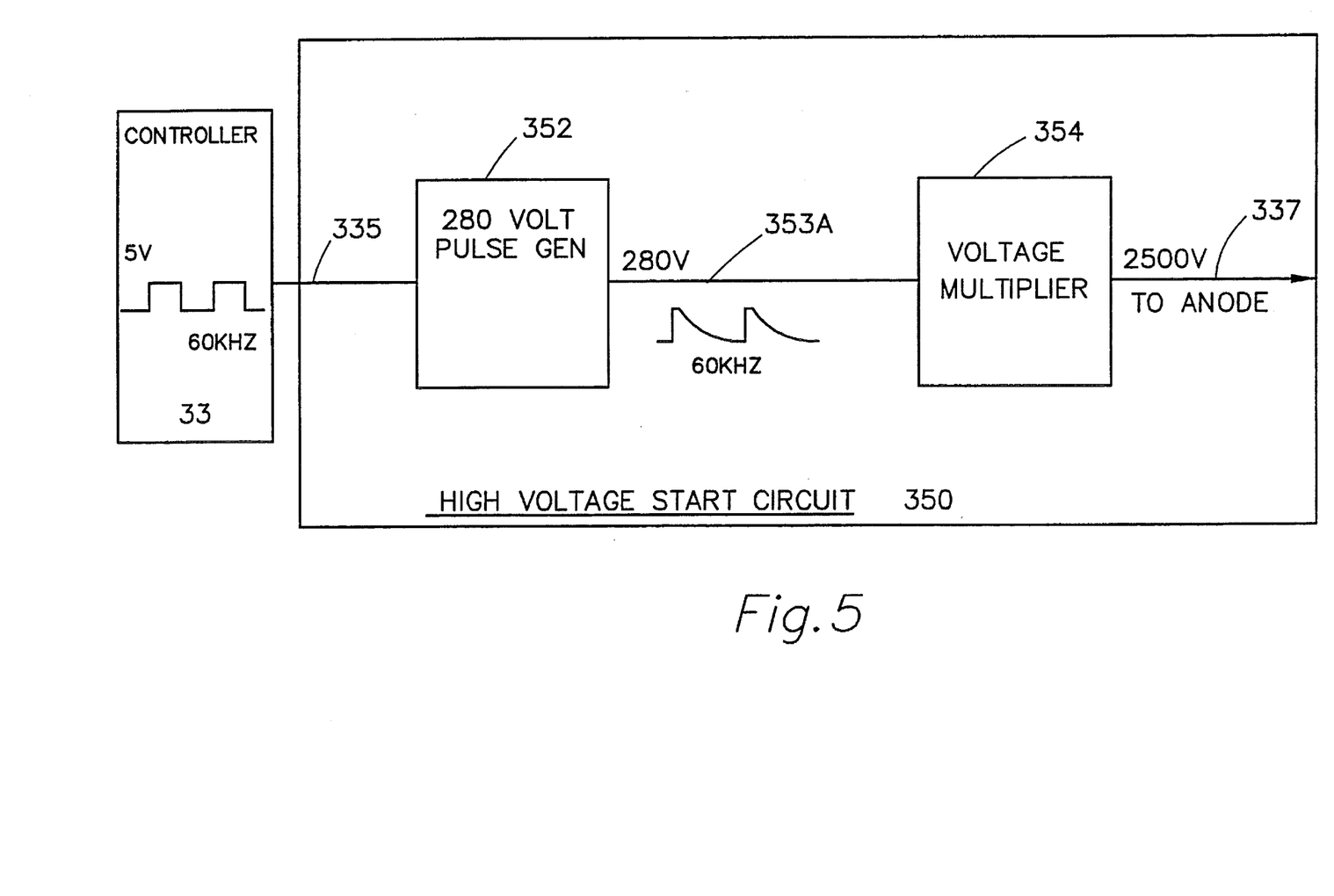
FIG. 5 schematically shows a block diagram of one embodiment of a high voltage start circuit as provided by one aspect of the invention.

Referring now to FIG. 5, also included in the active current apparatus provided by the current invention is high voltage start circuit means 350 which is coupled through line 337 and resistors 333 and 383 to anodes 14 and 16 of ring laser gyro block 10. This circuit is employed during the start mode of the ring laser gyro. At line 335, in this example, controller 100 supplies a 0 to 5 volts square wave at a frequency of about 60 KHz with a 10% duty cycle on line 335 which is input to the high voltage start circuit means 350. The high voltage start circuitry means 350 comprises a 280 volt pulse generator 352 and a voltage multiplier means 354. The pulse generator is used to step up the input voltage square wave on line 335 to a 280 volt signal represented by the waveform shown adjacent line 353. The 280 volt peak-to-peak signal output line 353 is also a 60 KHz signal having a 50% duty cycle which is fed into the voltage multiplier means 354. Voltage multiplier means 354 then outputs a high DC voltage of about 2500 volts. The 280 volt pulse generator and the voltage multiplier component are commercially available. The voltage multiplier component may be purchased from Voltage Multiplier, Inc. of California. The high voltage start circuit is used for starting the ring laser gyro and is turned off when the ring laser gyro is in a running mode.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. In a ring laser gyro in which at least one laser beam is generated by a current flowing in at least a portion of a cavity between ring laser gyro electrodes including an anode and a cathode, the ring laser gyro including a beam intensity readout, a power control system comprising:

(a) monitor means coupled to the beam intensity readout for generating an intensity signal indicative of the intensity of said beam at an intensity signal output;

(b) means for signal averaging coupled to said intensity signal output, said signal averaging means providing an average intensity signal at an average intensity signal output;

(c) means, coupled to the average intensity signal output, for converting the average intensity signal output to a digital signal on a digital signal output;

(d) means for processing coupled to the digital signal output wherein the processing means generates a power control signal on a power control line in response to and in proportion to the value of the digital signal; and (e) power supply means coupled at a programmable input to said power control line where said power supply means outputs a voltage signal on a voltage supply line coupled to a ring laser gyro electrode, where the voltage signal is responsive to said power control signal and the processing means and power supply means operate together so as to output a voltage signal to increase power to said ring laser gyro electrode in response to a decrease in beam intensity and decrease power to the electrode in response to an increase in beam intensity.

2. The power control system of claim 1 wherein the means for processing comprises a microprocessor.

3. The power control system of claim 1 wherein the means for processing comprises a microcontroller.

4. The power control system of claim 1 further comprising a digital-to-analog converter connected at an input to said power control line and operating to convert the power control signal into a corresponding analog control signal on an analog control output wherein said analog control output is coupled to said programmable input of said power supply means.

5. The power control system of claim 4 wherein said voltage supply line is coupled to a ring laser gyro cathode.

6. The power control system of claim 5 further comprising an active current control coupled to first and second anodes of said ring laser gyro.

7. In a ring laser gyro in which a first laser beam and a second laser beam are generated by a current flowing in at least a portion of a cavity between ring laser gyro electrodes including an anode and a cathode, the ring laser gyro including a first beam intensity readout and a second beam intensity readout, a power control system comprising:

(a) monitor means, coupled at a first monitor input to the first beam intensity readout and at a second monitor input to the second beam intensity readout, for generating an intensity signal indicative of the intensity of the weaker of said first laser beam and said second laser beam at an intensity signal output;

(b) means for signal averaging coupled to said intensity signal output, said signal averaging means providing an average intensity signal at an average intensity signal output;

(c) means, coupled to the average intensity signal output, for converting the average intensity signal output to a digital signal on a digital signal output;

(d) means for processing coupled to the digital signal output wherein the processing means generates a power control signal on a power control line in response to and in proportion to the value of the digital signal; and (e) power supply means coupled at a programmable input to said power control line where said power supply means outputs a voltage signal on a voltage supply line coupled to a ring laser gyro electrode, where the voltage signal is responsive to said power control signal and the processing means and power supply means operate together so as to output a voltage signal to increase power to said ring laser gyro electrode in response to a decrease in beam intensity and decrease power to the electrode in response to an increase in beam intensity.

8. The power control system of claim 7 wherein the means for processing comprises a microprocessor.

9. The power control system of claim 7 wherein the means for processing comprises a microcontroller.

10. The power control system of claim 7 further comprising a digital-to-analog converter connected at an input to said power control line and operating to convert the power control signal into a corresponding analog control signal on an analog control output wherein said analog control output is coupled to said programmable input of said power supply means.

11. The power control system of claim 10 wherein said voltage supply line is coupled to a ring laser gyro cathode.

12. The power control system of claim 11 further comprising an active current control coupled to first and second anodes of said ring laser gyro.

13. In a ring laser gyro in which a first laser beam and a second laser beam is generated by a current flowing in at least a portion of a cavity between ring laser gyro electrodes including an anode and a cathode, the ring laser gyro including a first beam intensity readout and a second beam intensity readout, a power control system comprising:

(a) a readout monitor, coupled at a first monitor input to the first beam intensity readout and at a second monitor input to the second beam intensity readout, for generating an intensity signal indicative of the intensity of the weaker of said first laser beam and said second laser beam at an intensity signal output;

(b) a signal averager coupled to said intensity signal output, said signal averager providing an average intensity signal at an average intensity signal output;

(c) an analog-to-digital converter coupled to the average intensity signal output, said analog-to-digital converter operating to convert the average intensity signal output to a digital signal on a digital signal output;

(d) a digital processor coupled to the digital signal output wherein the digital processor generates a power control signal on a power control line in response to and in proportion to the value of the digital signal; and (e) a digital-to-analog converter connected at an input to said power control line and operating to convert the power control signal into a corresponding analog control signal on an analog control output;

(f) a programmable power supply coupled at a programmable input to said analog control output where said programmable power supply means outputs a voltage signal on a voltage supply line coupled to a ring laser gyro electrode, where the voltage signal is responsive to said power control signal and the digital processor and programmable power supply operate together so as to output a voltage signal to increase power to said ring laser gyro electrode in response to a decrease in beam intensity and decrease power to the electrode in response to an increase in beam intensity.

14. The power control system of claim 13 wherein the digital processor comprises a microprocessor.

15. The power control system of claim 13 wherein the digital processor comprises a microcontroller.

16. The power control system of claim 13 wherein the programmable power supply voltage supply line is coupled to a ring laser gyro cathode.

17. The power control system of claim 13 further comprising an active current control coupled to first and second anodes of said ring laser gyro.

* * * * *

UNITED STATES PATENT AND TRADEMARK OFFICE
CERTIFICATE OF CORRECTION

PATENT NO. : 5,489,981
DATED : February 6, 1996
INVENTOR(S) : JOSEPH E. KILLPATRICK, DALE F. BERNDT It is certified that error appears in the above-indentified patent and that said Letters Patent is hereby corrected as shown below:

On title page, item

[54] cancel "MICROPROCESSOR CONTROLLED ANGLASER GYROPOWER CONTROL SYSTEM" and replace with --MICROPORCESSOR CONTROLLED RING LASER GYRO POWER CONTROL SYSTEM--

Item

[75] after "Joseph E. Killpatrick" add --Minneapolis-- after "Dale F. Berndt," add --Plymouth; both of Minnesota-- cancel "both of Hennepin, Minn."

Signed and Sealed this

Twenty-first Day of May, 1996

Attest:

BRUCE LEHMAN

Attesting Officer     Commissioner of Patents and Trademarks